March 16, 1926.

J. V. CUNNIFF 1,576,812

HEADLIGHT DIRECTOR

Filed March 10, 1925   2 Sheets-Sheet 1

Inventor
J. V. Cunniff.
by Hazard and Miller
Attorneys.

March 16, 1926. 1,576,812
J. V. CUNNIFF
HEADLIGHT DIRECTOR
Filed March 10, 1925 2 Sheets-Sheet 2

Inventor
J. V. Cunniff.
by Hazard and Miller
Attorneys.

Patented Mar. 16, 1926.

1,576,812

UNITED STATES PATENT OFFICE.

JOHN V. CUNNIFF, OF GRAHAM, CALIFORNIA, ASSIGNOR OF ONE-HALF TO MARTIN KROEGER, OF LOS ANGELES, CALIFORNIA.

HEADLIGHT DIRECTOR.

Application filed March 10, 1925. Serial No. 14,462.

*To all whom it may concern:*

Be it known that I, JOHN V. CUNNIFF, a citizen of the United States, residing at Graham, in the county of Los Angeles and State of California, have invented new and useful Improvements in Headlight Directors, of which the following is a specification.

This invention relates to improvements in headlight directors and is especially an improvement over the device disclosed in my prior patent, No. 1,489,931, issued April 8, 1924.

An object of this invention is to provide a detachable means for connecting the headlights of a vehicle to the steering mechanism of the vehicle, so that the light thrown from the headlights may be directed by the steering mechanism and so that the operative connection between the headlights and the steering mechanism may be disconnected so that the headlights will not be directed, if so desired. By connecting the headlights to the steering mechanism of a vehicle, a slightly additional load is placed upon the steering mechanism so that it is that much more difficult to steer the vehicle. By providing the detachable means for connecting the headlights to the steering mechanism of the vehicle, the headlights can be detached from the steering mechanism during the day time and thus facilitate steering the vehicle when the headlights are not employed.

A further object of this invention is to provide means for maintaining the headlights in a predetermined position when disconnected from the steering mechanism.

With the foregoing and other objects in view which will be made manifest in the following detailed description and pointed out in the appended claims, reference is had to the accompanying drawings for an illustrative embodiment of the invention, wherein:

Figure 1:
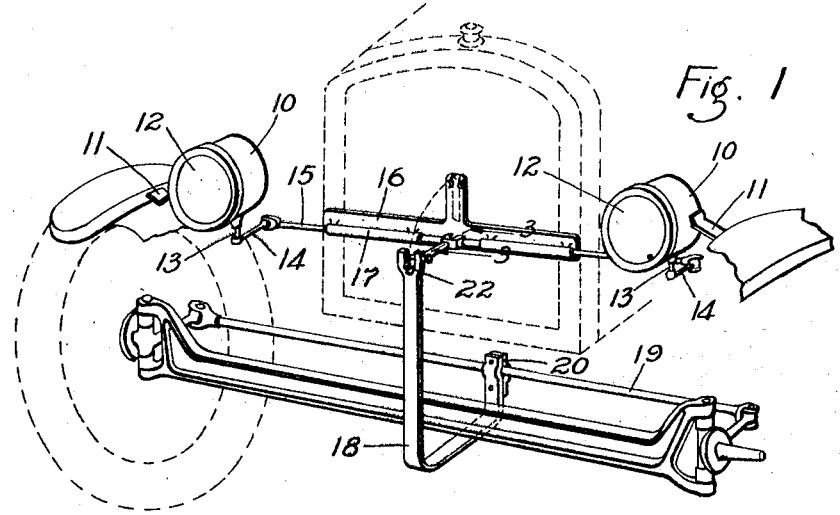
Figure 1 is a perspective view of the apparatus as applied to a vehicle, showing automobile parts in dotted lines.
Figures 2, 3:
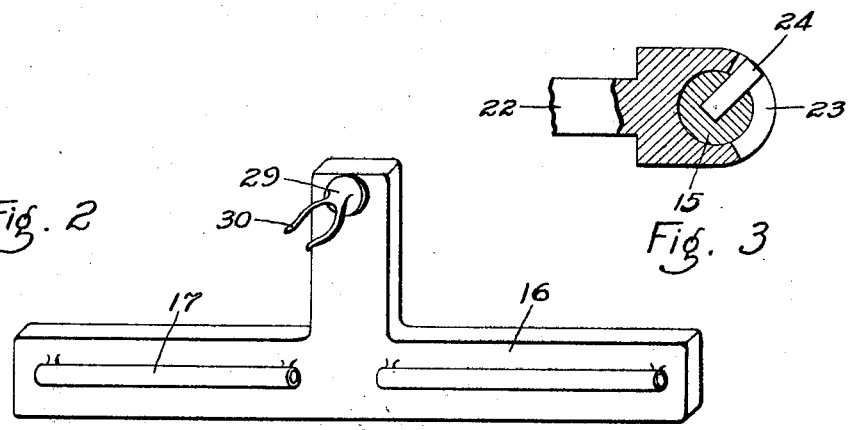
Fig. 2 is a perspective view of one of the members constituting a part of the apparatus, which is mounted upon the vehicle.
Fig. 3 is a vertical section taken substantially on the line 3—3 of Fig. 1.

Referring to the accompanying drawings wherein similar reference characters designate similar parts throughout, the headlights are in the form of cylindrical shells or drums 10, as disclosed in my prior patent, which are supported upon the fenders of the vehicle as by brackets 11. The drums 10 may be of any suitable construction and are provided with lenses 12. As disclosed in my prior patent, there are movable reflectors within the drums 10, which are mounted upon spindles 13. Cranks 14 are provided upon the lower ends of the spindles 13 and these cranks are connected by a transverse link 15. Upon the front of the vehicle, preferably across the radiator, there is mounted a member 16, which may have mounted thereon suitable bearings 17, within which the link 15 is slidable.

A lever or actuating arm 18 is rigidly mounted upon the transverse steering knuckle connecting link 19, as indicated at 20. The upper end of the lever 18 is provided with a recess 21. Adjacent the center of the link 15 there is a member 22, which has one end disposed about the link 15 so as to be pivoted thereto. A slot 23 is formed in the member 22, which is adapted to receive a pin 24 mounted upon the link 15. In this manner, the member 22 is pivoted upon the link 15 but is not slidable thereon, and lateral movement of the member 22 will produce lateral sliding of the link 15 and rotation of the spindles 13, upon which the reflectors are mounted. The forward end of the member 22 is receivable in the notch or recess 21 in the upper end of the lever 18.

Figure 4:
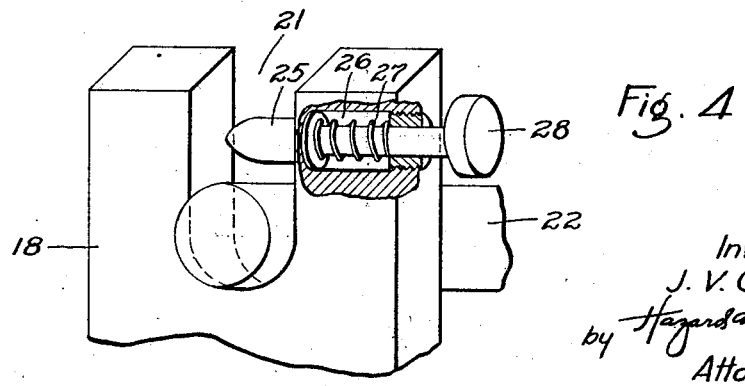
Fig. 4 is a perspective view illustrating the detachable means whereby the headlights can be disconnected from the steering mechanism.

A latch member 25 extends through one side of the lever 18 and into the notch 21. This latch member is disposed within a bore 26, and a coil spring 27 is compressed about the latch member 25 within the bore 26 and urges the latch into the position shown in Fig. 4, wherein the latch 25 serves to maintain the member 22 within the recess 21. A suitable handle 28 is provided upon the latch member 25, permitting the latch member to be withdrawn into the bore 26 so that the member 22 can be removed from the notch 21.

Upon the member 16 there is placed a retaining device 29 having resilient fingers 30, and when the member 22 is withdrawn from the notch or recess 21 so as to disengage the headlight from the steering mechanism of the vehicle, it maybe forced between the resilient fingers 30 and thus maintained in a predetermined position so that the reflectors within the drums 10 cannot swing about therein.

Figure 5:
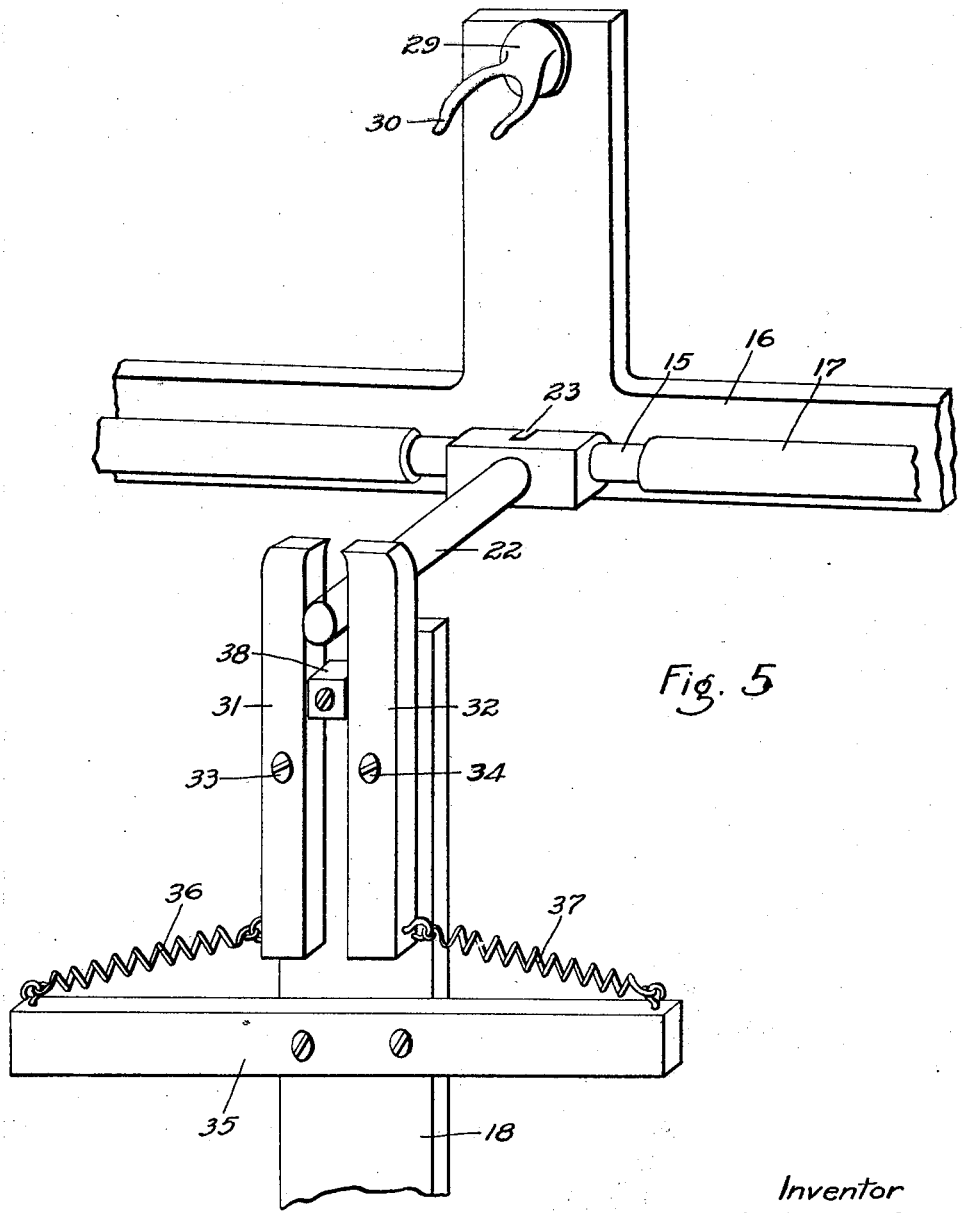
Fig. 5 is a perspective view of a slightly modified form of construction.

In the modification shown in Fig. 5, the member 16 having the bearings 17 thereon is provided, and the member carries the retaining device 29 with its resilient fingers 30. The transverse link 15 has the member 22 pivoted thereto, as before, and is adapted to be placed between two levers 31 and 32, which are pivoted as at 33 and 34 respectively to the upper end of the lever or actuating arm 18. A cross bar 35 is rigidly secured upon the lever 18 and coil springs 36 and 37 have their ends attached to the ends of the cross bar 35 and are also connected to the lower ends of the levers 31 and 32. In this manner the levers 31 and 32 are urged into engagement with the sides of the member 22 and effectively prevent rattling. The upper ends of the levers 31 and 32 are bent toward each other to limit the upward movement of the member 22. A stop 38 is mounted upon the lever 18 between them. The construction in Fig. 5 not only provides an anti-rattling connection between the steering mechanism of the vehicle and the headlights, but also provides a yieldable or resilient connection between the steering mechanism and the headlights. In this manner if the turn or rotation of the headlights or their reflectors is limited, the limited movement of the headlights does not interfere with the movement of the steering mechanism.

From the above it is believed to be readily apparent that I have provided an improved construction over that disclosed in my prior patent, wherein means is provided for detachably connecting the headlights to the steering mechanism, and means is also provided for maintaining the headlights in a predetermined position with respect to the vehicle when they are disconnected from the steering mechanism. Although my above described invention has been described as having reflectors within the drums 10 mounted upon the spindles 13, it is to be understood that the drums 10 may be mounted upon the spindles 13 and be rotated thereby, if so desired.

It will be understood that various changes in the details of construction may be made without departing from the spirit or scope of the invention as defined by the appended claims.

I claim:

1. In combination with a vehicle, a transverse link associated with the headlights of the vehicle capable upon lateral movement of directing the light thrown therefrom, a lever mounted upon the steering mechanism of the vehicle, a member pivoted upon said link adapted to engage upon said lever, and means for detachably maintaining said member in engagement with said lever whereby said headlights may be controlled by said steering mechanism.

2. In combination with a vehicle, a transverse link associated with the headlights of the vehicle capable upon lateral movement of directing the light thrown therefrom, a lever mounted upon the steering mechanism of the vehicle, means for detachably connecting said link to said lever, and means for maintaining said means in a predetermined position when detached so that the light thrown from said headlights will remain stationary with respect to said vehicle.

3. In combination with a vehicle, a transverse link associated with the headlights of the vehicle capable upon lateral movement of directing the light thrown therefrom, a lever mounted upon the steering mechanism of the vehicle, a member pivoted upon said link adapted to engage upon said lever, means for detachably maintaining said member in engagement with said lever whereby said headlights may be controlled by said steering mechanism, and a retaining device mounted upon the vehicle adapted to retain said member in a predetermined position when disengaged from said lever as and for the purpose described.

4. In combination with a vehicle, a transverse link associated with the headlights of the vehicle, a member secured to the vehicle providing bearings in which said link is slidable, a lever actuated by the steering mechanism of the vehicle, a second member pivoted to said link adapted to engage said lever whereby said headlights may be directed by said steering mechanism, means for detachably maintaining said second member in engagement with said lever, and a retaining means mounted upon the first mentioned member adapted to receive said second member when disengaged from said lever and maintain it in a predetermined position as and for the purpose described.

5. In combination with a vehicle, a transverse link associated with the headlights of the vehicle, a member secured to the vehicle providing bearings in which said link is slidable, a lever actuated by the steering mechanism of the vehicle, levers pivoted upon said lever, spring means for urging said levers toward each other, and a member pivoted to said transverse link adapted to be positioned between said levers and resiliently retained therebetween as and for the purpose described.

In testimony whereof I have signed my name to this specification.

JOHN V. CUNNIFF.